(No Model.)
J. W. BERNARD.
BEEFSTEAK HACKER.
No. 513,666. Patented Jan. 30, 1894.
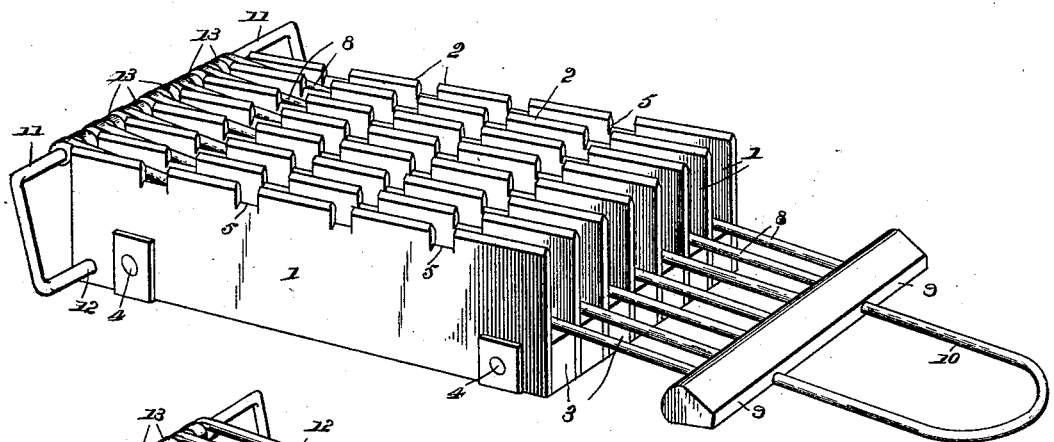
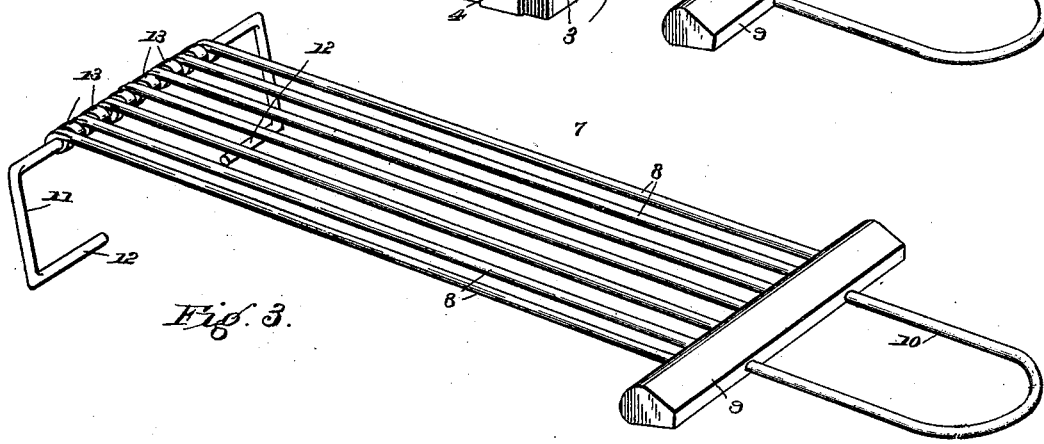
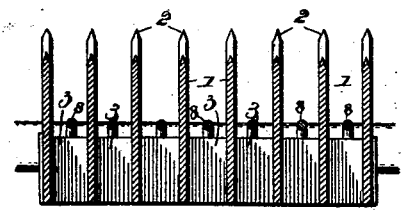
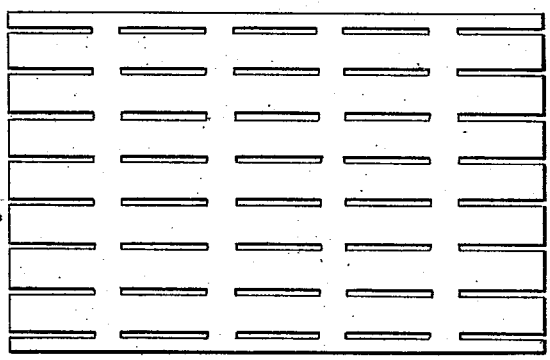
Witnesses
T. M. Johnson
N. W. Riley
Inventor
John W. Bernard
By his Attorneys,
C. A. Snow & Co.

UNITED STATES PATENT OFFICE.

JOHN W. BERNARD, OF HAM'S PRAIRIE, MISSOURI.

BEEFSTEAK-HACKER.

SPECIFICATION forming part of Letters Patent No. 513,666, dated January 30, 1894.

Application filed June 9, 1893. Serial No. 477,082. (No model.)

*To all whom it may concern:*

Be it known that I, JOHN W. BERNARD, a citizen of the United States, residing at Ham's Prairie, in the county of Callaway and State of Missouri, have invented a new and useful Beefsteak-Hacker, of which the following is a specification.

The invention relates to improvements in beefsteak hackers.

The object of the present invention is to improve the construction of beefsteak hackers and tenderers, and to provide one which will be simple, inexpensive, strong and durable and which will enable beefsteak to be quickly operated on in an effective manner without marring the same.

The invention consists in the construction and novel combination and arrangement of parts hereinafter fully described, illustrated in the accompanying drawings, and pointed out in the claims hereto appended.

In the drawings: Figure 1 is a perspective view of a beefsteak hacker constructed in accordance with this invention. Fig. 2 is a transverse sectional view. Fig. 3 is a detail perspective view of the meat-lifter for removing beefsteak from the knives. Fig. 4 is a plan view illustrating the manner in which a piece of beefsteak is cut by the hacker.

Similar numerals of reference designate corresponding parts in all the figures of the drawings.

1 designates a series of parallel blades, having sharpened upper edges 2, and spaced apart by longitudinally-disposed blocks 3, which are secured to the blades 1 by bolts 4, arranged transversely and passing through the blades and the blocks. The blades 1 may be of any desired number and length, and are provided at intervals in their upper edges with rectangular notches 5, which are arranged in transverse rows and which form transverse series of knives. The transverse series of knives 2 pass through the meat operated on, severing the tendons and leaders, and making the meat tender; and the V-shaped notches interrupt the knives and prevent a continuous cut or slicing which would sever and separate the meat.

In operation the meat is laid upon the sharpened upper edges of the blades and then struck by a wooden mawl or mallet to drive the knives 2 through the meat. This action forces the meat down between the blades 1, and in order to remove the meat quickly, without liability of tearing or disfiguring the same, a lifting-attachment 7 is employed. The lifting-attachment 7 consists of a series of rods 8, arranged in the intervals between the longitudinal blades 1, and having their front ends attached to a cross-bar 9, of a handle or bail 10. The rear ends of the rods are provided with eyes and are arranged on a rectangular link 11, which is hinged at its lower side 12 to the body of the hacker at the rear end of the outer blades 1, in bearing-openings. The eyes of the rods 8 are spaced by sleeves 13 on the upper side of the rectangular link, and by pulling forward on the bail or handle 10 the link swings upward, carrying with it the rods 8, thereby removing or expelling the meat from between the blades 1.

It will be apparent that the meat hacker is simple, inexpensive, strong and durable, that meat may be readily tendered in a rapid and effective manner and that it will not present a hacked or mutilated appearance, as will be seen from the diagram shown in Fig. 4.

Changes in the form, proportion, and the minor details of construction may be resorted to without departing from the principle or sacrificing any of the advantages of this invention.

The rectangular notches 5, which prevent the meat operated on from being severed and cut in strips are of sufficient depth to accomplish this result, and are provided at their bottoms with knife edges.

What I claim is—

1. In a meat hacker or tenderer, the combination of a body having a series of longitudinal blades spaced apart, a link arranged at one end of the body and having its lower side hinged thereto at the sides thereof, and a meat-lifter having one end free and provided with a series of rods arranged in the spaces between the blades and connected with the upper side of the link, substantially as described.

2. In a meat hacker or tenderer, the combination of a body provided with a series of blades spaced apart, a link arranged at the rear end of the body and having its lower side hinged thereto, and a meat-lifter having its front end free and comprising a series of rods arranged in the spaces between the blades and provided at their rear ends with eyes arranged on the upper side of the link, spacing sleeves interposed between the eyes, and a handle provided with a cross-bar connected to the front ends of the rods, substantially as described.

3. A meat hacker or tenderer provided with a series of blades, having notches in the cutting edges thereof, and provided at the bottoms of the notches with cutting edges, substantially as described.

In testimony that I claim the foregoing as my own I have hereto affixed my signature in the presence of two witnesses.

JOHN W. BERNARD.

Witnesses:
J. B. BLACKBURN,
T. M. CHRISTOPHER.